United States Patent [19]

Krinski et al.

[11] Patent Number: 4,961,788

[45] Date of Patent: Oct. 9, 1990

[54] ADHESIVE BINDERS FOR PAPER COATING COMPOSITION HAVING IMPROVED STABILITY AND WHITENESS

[75] Inventors: Thomas L. Krinski, Granite City, Ill.; Tam H. Tran; Jeffrey J. Gambaro, both of St. Loius, Mo.

[73] Assignee: Protein Technologies International, Inc., St. Louis, Mo.

[21] Appl. No.: 372,898

[22] Filed: Jun. 28, 1989

[51] Int. Cl.$^5$ ............................................. C08L 80/00
[52] U.S. Cl. ..................................... 106/154; 530/378
[58] Field of Search ....................... 106/154.1; 530/378

[56] References Cited

U.S. PATENT DOCUMENTS

| | | | |
|---|---|---|---|
| 2,246,466 | 6/1941 | Julian et al. | 260/112 |
| 2,274,983 | 3/1942 | Hieronymus | 530/378 |
| 2,397,307 | 3/1946 | Youtz | 260/112 |
| 2,712,539 | 7/1955 | Nugent et al. | 530/378 |
| 2,849,334 | 8/1958 | Hart | 117/64 |
| 2,881,076 | 4/1959 | Sair | 99/14 |
| 2,950,214 | 8/1960 | Smith | 117/64 |
| 3,081,182 | 3/1963 | Mahoney | 106/146 |
| 3,411,925 | 11/1968 | Lauterbach | 106/157 |
| 3,694,221 | 9/1972 | Hoer et al. | 99/17 |
| 4,048,380 | 9/1977 | Blakey et al. | 428/511 |
| 4,109,056 | 8/1978 | Craig et al. | 428/512 |
| 4,277,524 | 7/1981 | Nakajima et al. | 427/362 |
| 4,309,344 | 1/1982 | Walsh | 530/378 |
| 4,352,692 | 10/1982 | Krinski et al. | 106/79 |
| 4,421,564 | 12/1983 | Graham et al. | 106/154 R |
| 4,464,296 | 8/1984 | Jacks et al. | 530/378 |
| 4,474,694 | 10/1984 | Coco et al. | 106/154.1 |
| 4,520,048 | 5/1985 | Ranger | 427/350 |
| 4,575,477 | 3/1986 | Werkema et al. | 428/537.5 |
| 4,581,257 | 4/1986 | Kondo et al. | 427/336 |
| 4,607,089 | 8/1986 | Riley et al. | 527/201 |
| 4,620,992 | 11/1986 | Nojima et al. | 427/362 |
| 4,689,381 | 8/1987 | Krinski et al. | 530/378 |
| 4,812,550 | 3/1989 | Erickson et al. | 527/201 |
| 4,824,940 | 4/1989 | Shih | 530/377 |

OTHER PUBLICATIONS

"Soy Protein Latex Interpolymers-Properties and Function", Proceedings of the 1987 Coating Conference TAPPI, pp. 133–139, (Coco), C. E.

"Ultrahigh Finish Coated Papers—Cast Coating and Other Processes," Pigmented Coating Processes for Paper and Board, TAPPI Monograph No. 28, pp. 74–85, Casey, J. P.

"Isolated Soy Protein Binders for Paper and Paperboard Coatings" Protein Binders in Paper and Paperboard Coating, TAPPI Monograph No. pp. 75–96, Olson, R. A. and Hoelderle, P. T.

"Pigment Coating," Pulp and Paper Chemistry and Chemical Technology, pp. 1551–1753, 1961, Casey, J. P.

"Preparation and Functional Properties of Enzymatically Deamidated Soy Protein", Journal of Food Science, vol. 54, No. 3, 1989, pp. 598–602 (Hamada and Marshall).

"Deamidation of Food Proteins by Protease in Alkaline pH" Journal of Agricultural Chemistry, vol. 35, 1987, pp. 224–227.

Primary Examiner—William R. Dixon, Jr.
Assistant Examiner—Helene Klemanski
Attorney, Agent, or Firm—Virgil B. Hill

[57] ABSTRACT

A protein paper coating adhesive, and the coating composition using the protein adhesive, has increased room temperature stability and has improved whiteness. The adhesive is capable of producing high solids coatings compositions when the adhesive binder solutions are prepared either hot or cold.

13 Claims, No Drawings

ADHESIVE BINDERS FOR PAPER COATING COMPOSITION HAVING IMPROVED STABILITY AND WHITENESS

BACKGROUND AND SUMMARY OF THE INVENTION

This invention relates to production of protein containing paper coating compositions and particularily those containing modified vegetable protein as the adhesive binder. Applicant is aware of the following U.S. Patents the disclosures of which are incorporated by reference herein.

U.S. Pat. Nos. 2,274,983
2,246,466
2,849,334
2,881,076
2,950,214
3,081,182
3,411,925
4,048,380
4,109,056
4,277,524
4,352,692
4,421,564
4,474,694
4,520,048
4,575,477
4,581,257
4,607,089
4,620,992
4,812,550

Vegetable protein binders are well known as adhesive binders for paper coating compositions. In particular, modified soy protein has found extensive use as an adhesive binder in paper coating compositions. These adhesive binders are typically prepared from isolated soy protein extracted from oil free soybean flakes in an alkaline solution and recovered by isoelectric precipitation. The recovered soy protein is then typically modified by hydrolysis and other chemical treatment to prepare a protein adhesive material suitable for use as a binder in paper coating compositions. These binders find wide usage in the paper coating industry.

However, in spite of their wide acceptance, these materials still suffer some disadvantages, particularly when compared with casein and other synthetic containing adhesive binders for paper coating compositions.

In particular, soy protein binder solutions and coating compositions containing soy protein binders have in the past been handicapped by a lack of stability at room temperature. As a result it is often not possible to prepare large quantities of these materials suitable for long paper coating runs, since the color and properties of the paper coating composition will deteriorate as a result of the bacterial attack on the protein binder itself. Moreover, paper coating compositions prepared from these adhesives have in the past also suffered from reduced whiteness, that is by having a yellow undertone present and from a lack of gloss and optical brightness in the prepared paper coating composition.

Applicants have found however, that if conventional soy protein materials are subjected to an oxidation treatment, an unexpected increase in the stability and life of paper coating compositions prepared from the adhesives will result. The oxidizer may be a conventional strong oxidizing material, such as hydrogen peroxide or an equivalent oxidizer. Typically the adhesive material is treated in the wet state, for example as a wet curd recovered from the isolation or hydrolysis process. The conditions of oxidation are not critical, but for hydrogen peroxide a typical addition would be between about 3% to 25% hydrogen peroxide (70% solution) based on the weight of the dry solids. Oxidation would typically be carried out at slightly elevated temperatures, for example, from about 30° C. to 70° C., for example 60° C. for times from about ½ hour to 6 hours, preferably about 90 minutes.

In addition to providing an unexpected increase in the shelf life of the paper coating compositions prepared from the binder, the binder also imparts significantly improved properties in terms of the overall optical characteristics of the coated paper. Use of this adhesive binder can increase the whiteness of the coatings prepared from it to levels equal to or better than those obtained by casein, an industry standard. The gloss and the brightness of the paper coatings using applicants' compositions are exceptional.

It has also been unexpectedly found that the solubility characteristics of the new adhesive binder are such that adhesive binder solutions, and thus paper coating compositions, can be prepared at much greater percent solids, thus enabling paper producers to realize a substantial savings in the energy cost required to drive the water of suspension out of the paper coating compositions. These high solids adhesive binder solutions can be prepared both using cold (room temperature) water and using water which has been heated. In either case, considerable increase in the dispersability of the adhesive binders is achieved.

It is thus an object of applicants' invention to prepare a soy protein, adhesive binder, and a paper coating composition produced therefrom, which has an increased room temperature storage life when formed into paper coating compositions.

It is an object of applicants' invention to prepare an adhesive binder from soy protein which has the ability to produce high solids coating compositions, when prepared hot or cold.

It is a further object of applicants' invention to prepare an adhesive binder and a paper coating composition which has room temperature shelf life and storage stability suitable for use in long coating runs.

It is a further object of applicant's invention to produce an adhesive binder which has increased whiteness, brightness and gloss.

These and other objects of the invention will be understood from the following description of the preferred embodiments.

DESCRIPTION OF THE PREFERRED EMBODIMENTS

The present invention applies to vegetable protein material and specifically to soy protein isolate. Preferably the invention is applied to isolate which has been treated to modify the basic protein extract by carboxylation, as described in U.S. Pat. 4,474,694. However, various aspects of the invention could be applied to other protein materials.

In the invention, the isolated proteinaceous material is further modified by a stabilizing and bleaching agent, such as hydrogen peroxide, following extraction and hydrolysis of the protein isolate. This treatment is typically conducted with between about 3 to 25 per cent of hydrogen peroxide, based on the weight of the dry solids. Other modifying materials such as ammonia, sodium silicate stabilizer and other materials may also be used to treat the isolated protein.

Following treatment the isolated and treated protein is then dried by spray drying to produce a powered isolate adhesive binder. The dried binder may be further treated with a wetting agent, for example between about 3% to 7% propylene glycol. Other anti-caking and flow-enhancing materials may be added, such as fumed silica at about between 0.2% to 0.6%. These additions are calculated on a dry weight basis.

The invention may be further understood by reference to the following examples.

EXAMPLE 1

An extracted and hydrolysed soy protein isolate, prepared by the method of U.S. Pat. No. 4,474,694 utilizing 10% phthalic anhydride modifier, was reacted as follows. One hundreds parts of the soy polymer isolate having a solids content of about 15% by weight were combined with nine parts ammonia (30oBe), three parts sodium silicate and ten parts hydrogen peroxide (70%). This reaction mixture had a pH of about 9.5. The mixture was reacted for ninety minutes at 60° C. and then was spray dried in a conventional spray dryer. The dried modified protein isolate was then blended with 5% propylene glycol and 0.5% fumed silica.

EXAMPLE 2

The material prepared by Example 1 was compared for dispersability with a conventional soy protein adhesive binder. It was found that the material of Example 1 could be prepared in coating compositions having as much as 80% greater solids than conventional soy protein isolate binder. The material of Example 1 can be dispersed in solutions at levels considerably above 28% and up to 37% solids by weight, as compared with 25% for the conventional material, when the solution was prepared using heated water (60° C.). Using room temperature water, the material prepared by Example 1 can be dispersed at levels considerably above 20% and up to 29% by weight solids, as compared to 18% to 19% for a conventional material. The material of Example 1 can be prepared in solution separately or added directly in its dry form to pigment slurries. The method of preparation is as follows: To a tank of water (hot or cold) is slowly added the dry material of Example 1, and pigments, as shown in Example 3, under agitation. Three percent ammonia based on the weight of the dry soy polymer is added to the mixture and after mixing the pH is adjusted to about 9.0. The mixture is agitated for a minimum of fifteen minutes to place all of the dry product in suspension.

EXAMPLE 3

The coating adhesive of Example 1 can be used to prepare a paper coating having the following composition: One hundred parts by weight kaolin (#1 clay), 7.5 parts latex (DOW 620), 7.5 parts protein binder (Example 1) and 115 parts water. The paper coating was mixed as described in Example 2. For comparison purposes a paper coating composition was prepared at the same proportions, but substituting conventional soy protein (SP 2500) for the material of Example 1. These materials were placed in room temperature tests for one week to determine the room temperature stability. The results of that test are given in Tables 1 and 2. As shown, after six days of room temperature storage the conventional coating composition had decomposed to the point of being entirely unacceptable from the standpoint of color, odor and coating strength. The material prepared from the adhesive binder of Example 1 exhibited only minor decomposition by the end of the sixth day and was still acceptable for use as a paper coating material. The color of the coating using the material of Example 1 was still white and would produce a bright, high-gloss finish on coated paper. The conventional material was unacceptable from a color, odor and coating strength standpoint. Table 2 shows the bacterial count of the conventional material and the material of applicants+ invention. As can be seen, both materials started with a relatively low bacterial count. The bacterial count of the product of the invention stayed essentially unchanged for an entire day and then slowly rose to about $10^8$ per gram by the end of the third day. The bacterial count of the conventional material began to rise immediately and was $10^9$ by the end of the third day. By the end of the first day the bacterial count of the conventional material had increased tenfold, to $10^7$ per gram. At the end of the first day, and all days thereafter, the bacterial count of applicants' product was only 1/10 of that of the conventional material.

TABLE 1

| COATING STABILITY | | |
|---|---|---|
| | COATING WITH SP2500 (RALSTON PURINA) | COATING WITH EXAMPLE 1 BINDER |
| Day 0 | none | none |
| Day 1 | none | none |
| Day 3 | weak | none |
| Day 6 | strong (unacceptable) | weak (acceptable) |

(Coating samples were exposed to air under slight agitation.)

TABLE 2

| COATING BIO-STABILITY/ROOM TEMPERATURE | | | | |
|---|---|---|---|---|
| | BACTERIAL COUNT PER GRAM | | | |
| | Start | 1 day | 2 days | 3 days |
| SP 2500 (Ralston Purina) | $<10^6$ | $10^7$ | $10^8$ | $10^9$ |
| Example 1 binder | $<10^6$ | $<10^6$ | $<10^7$ | $10^8$ |

As shown above, applicant's modified adhesive binder is effective at producing coating compositions having much higher solids content than is possible by conventional materials. This increased high solids material substantially reduces the drying cost required to dry the coated paper and remove the water of suspension from the coating composition. Moreover, applicants' material, at this high solid content, maintains its flow properties and will improve the flow properties of paper coating compositions as compared to conventional materials. Applicants' material works faster and has a greater lubricating action so that paper coating compositions prepared from this adhesive binder are much more forgiving of process conditions than conventional coating materials.

EXAMPLE 4

Applicants' material also has improved optical and color properties over conventional soy materials. The optical properties of applicants' new soy adhesive binders are equal or superior to those of casein. A comparison of the optical characteristics of applicants' new adhesive binder and conventional materials is shown in Table 3. As seen in Table 3, the Hunter color determinations indicate that the new material is as least equal to and in some regards superior to casein and greatly superior to the conventional soy protein materials in whiteness.

TABLE 3

HUNTER COLOR DETERMINATION

| SOLID PRODUCT | L(whitness) | a(red/green) | b(blue/yellow) |
| --- | --- | --- | --- |
| CASEIN | +84.3 | −1.6 | +15.0 |
| PC 400 (Ralston Purina) | +67.6 | −0.2 | +17.3 |
| SP 2500 (Ralston Purina) | +69.3 | −0.5 | +16.1 |
| Example 1 | +88.6 | −1.5 | +14.1 |
| 13.5% SOLUTION | L(whitness) | a(red/green) | b(blue/yellow) |
| CASEIN | +42.5 | −2.2 | + 7.0 |
| PC 400 (Ralston Purina) | +34.9 | −0.3 | +11.2 |
| SP 2500 (Ralston Purina) | +34.2 | −0.5 | +10.1 |
| Example 1 | +58.1 | −3.2 | +17.6 |

It will be appreciated by those skilled in the art that various changes may be made in the invention as disclosed without departing from the spirit of the invention. The invention is not to be to the specifics of the disclosed embodiments, which are for purpose of illustration, but rather is to be limited only by the scope of the appended claims and their equivalents.

We claim:

1. A method of producing a modified protein adhesive having improved stability, dispersability and whiteness comprising isolating a vegetable protein material, hydrolysing the protein material to produce an adhesive protein, carboxylating the adhesive protein and treating the carboxylated adhesive protein with an oxidizing material at a pH of about 9.5, the oxidizing material being effective to impart substantially increased stability and room temperature shelf life to coating compositions containing the adhesive protein and increasing the ability of the adhesive binder to from high solids coating compositions, the adhesive binder produced also forming paper coatings having increased gloss, brightness and white color in comparison to conventional vegetable protein containing paper coatings.

2. The method of claim 1 wherein the oxidizing material is hydrogen peroxide.

3. The method of claim 1 wherein the vegetable protein is soy protein.

4. The method of claim 1 wherein the oxidizing treatment is conducted at between about 30° C. to 70° C. for between about ½ to 6 hours.

5. A modified adhesive protein having increased whiteness, dispersability and stability produced by the method of claim 1.

6. A method of producing a paper coating composition having improved stability, dispersability and whiteness comprising suspending a paper coating pigment in an aqueous base, combining the pigment and aqueous base with a vegetable protein binder, the vegetable protein binder being carboxylated and the carboxylated protein binder being oxidized by an oxidizing material at a pH of about 9.5, the oxidation being effective to impart substantially increased stability and room temperature shelf life to the paper coating composition, the proteinaceous binder being effective to produce paper coating compositions having increased solids content and effective to produce uniform coatings having increased gloss, brightness and whiteness in comparison to conventional vegetable protein paper coatings.

7. The method of claim 6 wherein the vegetable protein is soy protein.

8. The method of claim 6 wherein the soy protein is oxidized with hydrogen peroxide.

9. The method of claim 6 wherein the adhesive binder is dispersable at room temperature at above about 20% by weight solids.

10. The method of claim 6 wherein the adhesive binder is dispersable at 60° C. at above about 28% by weight solids.

11. The method of claim 6 wherein the adhesive binder has a Hunter whiteness index (L) above about 80.

12. The method of claim 6 wherein the paper coating composition is shelf stable at room temperature for up to six days.

13. A paper coating composition having increased whiteness, dispersability and stability produced by the method of claim 6.

* * * * *